(12) United States Patent
Ilinich et al.

(10) Patent No.: US 7,704,486 B2
(45) Date of Patent: Apr. 27, 2010

(54) PRECIOUS METAL WATER-GAS SHIFT CATALYST WITH OXIDE SUPPORT MODIFIED WITH RARE EARTH ELEMENTS

(75) Inventors: Oleg Mikhailovich Ilinich, Monmouth Junction, NJ (US); Robert J. Farrauto, Princeton, NJ (US); Wolfgang Friedrich Ruettinger, East Windsor, NJ (US); Xiaolin Yang, Edison, NJ (US)

(73) Assignee: BASF Corporation, Florham Park, NJ (US)

( * ) Notice: Subject to any disclaimer, the term of this patent is extended or adjusted under 35 U.S.C. 154(b) by 1422 days.

(21) Appl. No.: 11/059,148

(22) Filed: Feb. 16, 2005

(65) Prior Publication Data

US 2006/0182679 A1    Aug. 17, 2006

(51) Int. Cl.
*C01B 3/16* (2006.01)
(52) U.S. Cl. .................. 423/656; 423/655
(58) Field of Classification Search ............... 423/655, 423/656
See application file for complete search history.

(56) References Cited

U.S. PATENT DOCUMENTS

| | | | |
|---|---|---|---|
| 3,111,396 A | 11/1963 | Ball ............................ 25/156 |
| 3,781,221 A | 12/1973 | Kominami et al. .......... 252/432 |
| 4,119,474 A | 10/1978 | Whitman et al. ............. 106/65 |
| 4,233,180 A * | 11/1980 | Hausberger et al. ......... 252/373 |
| 4,738,946 A | 4/1988 | Yamashita et al. .......... 502/303 |
| 5,272,017 A | 12/1993 | Swathirajan et al. ......... 429/33 |
| 6,080,379 A * | 6/2000 | Nedez et al. ................ 423/511 |
| 6,555,088 B1 | 4/2003 | Baumann et al. ............ 423/656 |
| 6,723,298 B1 | 4/2004 | Baumann et al. ......... 423/437.2 |
| 6,777,117 B1 | 8/2004 | Igarashi et al. ................ 429/19 |
| 6,790,432 B2 | 9/2004 | Ruettinger et al. .......... 423/656 |
| 7,160,533 B2 * | 1/2007 | Hagemeyer et al. ......... 423/655 |
| 2002/0131915 A1 | 9/2002 | Shore et al. ................. 422/177 |
| 2002/0141938 A1 | 10/2002 | Ruettinger et al. .......... 423/652 |
| 2002/0147103 A1 | 10/2002 | Ruettinger et al. ............ 502/66 |
| 2003/0186804 A1 | 10/2003 | Wagner et al. .............. 502/300 |
| 2004/0177556 A1 | 9/2004 | Hagemeyer et al. ........ 48/198.7 |
| 2004/0180781 A1 | 9/2004 | Taguchi et al. .............. 502/304 |
| 2004/0184986 A1 | 9/2004 | Hagemeyer et al. ......... 423/656 |
| 2004/0209772 A1 | 10/2004 | Fukunaga et al. ........... 502/332 |
| 2004/0220052 A1 | 11/2004 | He .............................. 502/313 |

(Continued)

FOREIGN PATENT DOCUMENTS

EP    0 361 648 A1    4/1990

(Continued)

OTHER PUBLICATIONS

"Effect of Basic Additives on Pt/Al2O3 for CO and Propylene Oxidation under Oxygen-Deficient Conditions" (Lee C-H et al.)—Industrial & Engineering Chemistry Research, American Chemical Society. Washington, US., vol. 36, 1997, pp. 1498-1506.

*Primary Examiner*—Stanley Silverman
*Assistant Examiner*—Paul Wartalowicz
(74) *Attorney, Agent, or Firm*—Bernard Lau

(57) ABSTRACT

A water gas shift catalyst comprising a platinum group metal dispersed on an inorganic oxide support modified with a carbon-containing burn-out additive and a rare earth oxide. A water gas shift catalyst containing alumina, a platinum group metal, and oxides of Pr and Nd are also disclosed.

12 Claims, 5 Drawing Sheets

U.S. PATENT DOCUMENTS

2005/0005520 A1    1/2005    Faur-Ghenciu et al. ..... 48/198.3

FOREIGN PATENT DOCUMENTS

| | | | |
|---|---|---|---|
| EP | 1 161 991 | A1 | 12/2001 |
| EP | 1 433 745 | A2 | 6/2004 |
| EP | 1 442 791 | A1 | 8/2004 |
| GB | 2 046 118 | A | 11/1980 |
| WO | WO 2004/058632 | A2 | 7/2004 |

* cited by examiner

PRECIOUS METAL WATER-GAS SHIFT CATALYST WITH OXIDE SUPPORT MODIFIED WITH RARE EARTH ELEMENTS

FIELD OF THE INVENTION

The present invention relates to a method for conducting the water-gas shift reaction with platinum group metal-based water gas shift catalysts that have improved activity and stability. The present invention also relates to methods for the use of these catalysts for generating hydrogen by reaction of carbon monoxide (CO) and steam (gaseous $H_2O$), and in particular to generating hydrogen from a gas stream comprising hydrogen, water, and carbon monoxide. The catalysts and methods of the invention are useful, for example, in generating hydrogen in the gas stream supplied to fuel cells, particularly to proton exchange membrane (PEM) fuel cells.

BACKGROUND OF THE INVENTION

Fuel cells directly convert chemical energy into electricity thereby eliminating the mechanical process steps that limit thermodynamic efficiency, and have been proposed as a power source for many applications. The fuel cell can be two to three times as efficient as the internal combustion engine with little, if any, emission of primary pollutants such as carbon monoxide, hydrocarbons and nitric oxides. Fuel cell-powered vehicles which reform hydrocarbons to power the fuel cell generate less carbon dioxide (green house gas) and have enhanced fuel efficiency.

Fuel cells, including PEM fuel cells [also called solid polymer electrolyte or (SPE) fuel cells], generate electrical power in a chemical reaction between a reducing agent (hydrogen) and an oxidizing agent (oxygen) which are fed to the fuel cells. A PEM fuel cell includes an anode and a cathode separated by a membrane which is usually an ion exchange resin membrane. The anode and cathode electrodes are typically constructed from finely divided carbon particles, catalytic particles supported on the carbon particles and proton conductive resin intermingled with the catalytic and carbon particles. In typical PEM fuel cell operation, hydrogen gas is electrolytically oxidized to hydrogen ions at the anode composed of platinum reaction catalysts deposited on a conductive carbon electrode. The protons pass through the ion exchange resin membrane, which can be a fluoropolymer of sulfonic acid called a proton exchange membrane. $H_2O$ is produced when protons then combine with oxygen that has been electrolytically reduced at the cathode. The electrons flow through an external circuit in this process to do work, creating an electrical potential across the electrodes. Examples of membrane electrode assemblies and fuel cells are described in U.S. Pat. No. 5,272,017.

Fuel cell processors (also known as fuel cell reformers) supply a hydrogen-containing gas stream to the fuel cell. Fuel cell processors include reactors that steam reform hydrocarbon feedstocks (e.g., natural gas, LPG) and hydrocarbon derivatives (e.g., alcohols) to produce a process stream enriched in hydrogen. Other by-products from the steam reforming of hydrocarbon include carbon monoxide and carbon dioxide. For example, methane is converted to hydrogen, carbon monoxide and carbon dioxide by the two reactions below:

$$CH_4+H_2O \rightarrow 3H_2+CO$$

$$CH_4+2H_2O \rightarrow 4H_2+CO_2$$

The resulting gas is then reacted in the water-gas shift reactor where the process stream is further enriched in hydrogen by reaction of carbon monoxide with steam in the water-gas shift reaction:

$$CO+H_2O \leftrightarrow CO_2+H_2$$

In fuel cell processors, the reaction is often conducted in two stages for purposes of heat management and to minimize the outlet CO concentration. The first of two stages is optimized for reaction at higher temperatures (about 350° C.) and is typically conducted using catalysts based on combinations of iron oxide with chromia. The second stage is conducted at lower temperatures (about 200° C.) and is typically conducted using catalysts based on mixtures of copper and zinc materials.

Other catalysts that can be used to conduct the water-gas shift reaction include platinum-based catalysts such as platinum on an alumina support or platinum on a cerium oxide support. While effective at producing hydrogen using the water-gas shift reaction when operated at temperatures above about 300° C., water-gas shift reaction catalysts also cause the formation of methane ($CH_4$) by catalyzing the reaction of CO with hydrogen as shown below:

$$CO+3H_2 \rightarrow CH_4+H_2O.$$

This undesired side reaction sacrifices three moles of hydrogen for each mole of carbon monoxide converted to methane. Methanation can also occur under these conditions with carbon dioxide according to the equation shown below:

$$CO_2+4H_2 \rightarrow CH_4+2H_2O$$

In this side reaction four moles of hydrogen are consumed for each mole of carbon dioxide converted to methane. The production of methane during the water gas shift reaction (referred to herein as "methanation") is a side reaction that consumes hydrogen gas in an exothermic reaction to ultimately reduce the hydrogen yield from the water gas shift reaction. Moreover, the methanation reactions accelerate with increasing catalyst bed temperatures. This property presents a liability, as the exothermic reaction can result in a runaway reaction with carbon dioxide, in addition to carbon monoxide, being methanated. Major hydrogen loss can occur and the catalyst can be damaged by high temperatures. In addition, methane is a greenhouse gas. The fuel cell is advertised as an emission-free energy producer, and release of methane is undesirable. Methane is difficult to combust during normal operating conditions of the fuel cell, so producing an appreciable quantity of methane is environmentally unfavorable.

Metals such as cobalt (Co), ruthenium (Ru), palladium (Pd), rhodium (Rh) and nickel (Ni) have also been used as WGS catalysts but are normally too active for the selective WGS reaction and cause methanation of CO to $CH_4$ under typical reaction conditions. In other words, the hydrogen produced by the water gas shift reaction is consumed as it reacts with the CO present in the presence of such catalysts to yield methane. This methanation reaction activity has limited the utility of metals such as Co, Ru, Pd, Rh and Ni as water gas shift catalysts.

A need exists, therefore, for a method to produce a hydrogen-rich syngas, and catalysts which are highly active and highly selective for hydrogen generation at moderate temperatures (e.g. below about 450° C.) to provide a hydrogen-rich syngas from a gas mixture containing hydrogen and carbon monoxide.

SUMMARY OF THE INVENTION

In one embodiment, the invention relates to a method of producing hydrogen from an input gas stream containing carbon monoxide and steam. The method includes contacting the input gas stream with a catalyst that contains: an inorganic oxide support; a platinum group metal dispersed on the inorganic oxide support; and wherein the support is modified with a rare earth oxide which increases the activity and stability of the catalyst. Further improvements in stability are achieved by further modifying the oxide support with an additive that is burned out of the support during calcination.

In accordance with the invention, applicants have found methods for conducting the water-gas shift reaction to produce hydrogen from carbon monoxide and steam using novel platinum group metal-based catalysts. The catalytic activity for the water-gas shift reaction is improved over processes conducted under similar conditions with conventional platinum metal-based catalysts. The novel catalyst includes a modified inorganic oxide support to improve the catalytic activity and the resistance to aging of the catalyst.

The catalysts of the invention include one or more platinum group metals as catalytic agents dispersed on an inorganic oxide support that has been modified by the addition of rare earth oxides thereto. The inorganic oxide support can be further modified by inclusion of a burn-out additive such as wood flour, which additive is removed from the support during calcination. The catalysts can be in the form of extrudates, tablets, or washcoat compositions deposited on substrates. Preferred forms of the catalysts are as washcoat compositions deposited on monolith substrates.

DETAILED DESCRIPTION OF THE INVENTION

Figure 1:
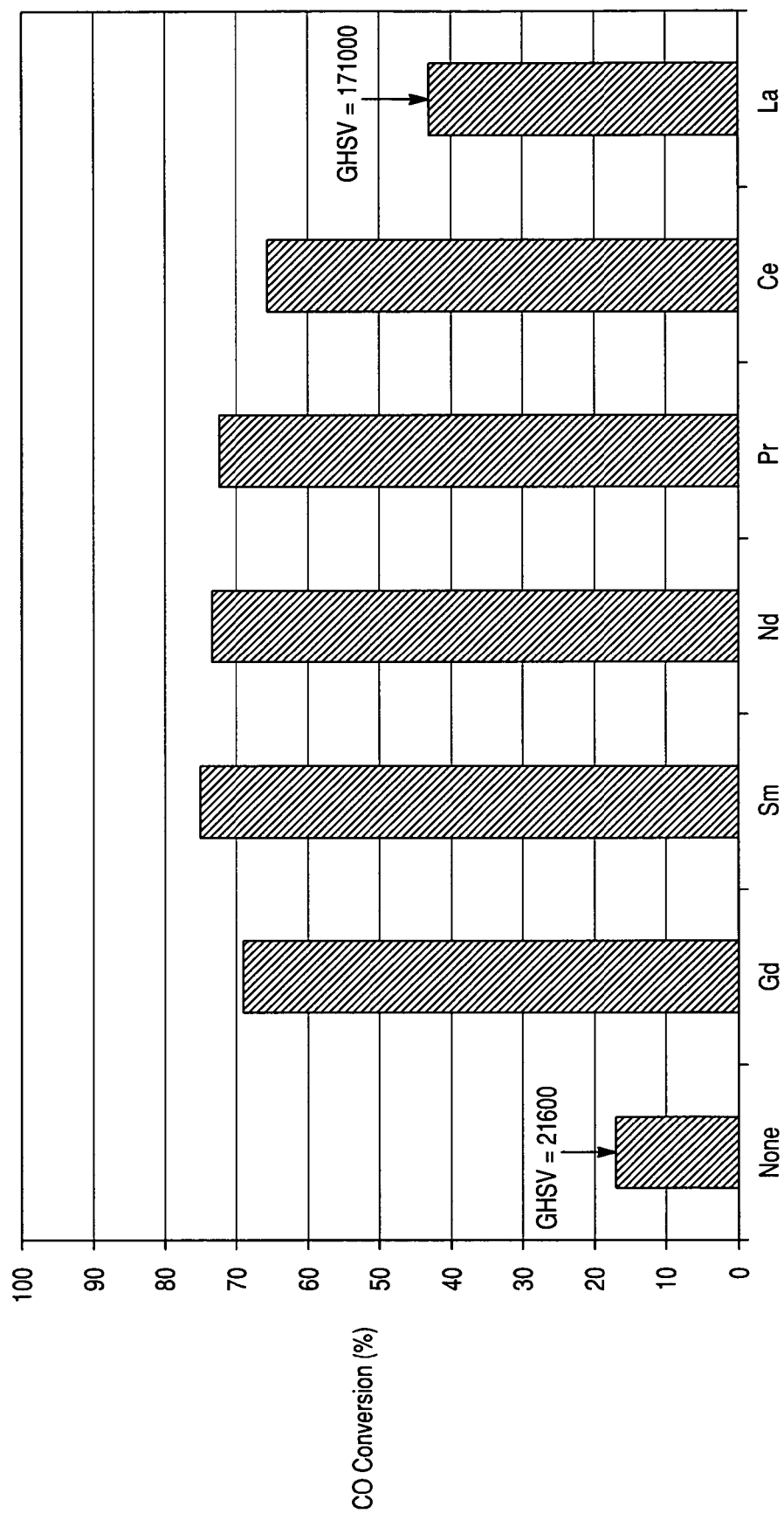
FIG. 1 is a bar graph comparing the activities of Pt catalysts over different rare earth oxide-modified alumina supports during a water gas shift reaction.

The platinum group metals useful in the composition include one or more of platinum, palladium, rhodium, ruthenium and iridium. A preferred platinum group metal is platinum. Typically, there is at least 0.1 wt. % of the platinum group metal in the catalyst composition. Preferably, there is about 0.5 to 10 wt. %, and more preferably about 0.75 to 5 wt. % of the platinum group metal in the catalyst composition. Platinum group metal levels of from 1.0 to 10 wt. % are also exemplified.

Useful inorganic oxide supports include high surface area inorganic oxide supports. These inorganic oxide supports include, for example, activated alumina, zirconia, titania, silica and rare earth metal oxides. Other useful supports include combinations of these inorganic oxides. Preferably, the inorganic oxide support has a specific surface area of at least 10 $m^2/g$. More preferably, the inorganic oxide support has a specific surface area of at least 50 $m^2/g$.

For all embodiments, the catalyst is preferably formed by dispersing the platinum group metal on a rare earth oxide-modified inorganic oxide support. The platinum group metal is preferably dispersed on the modified inorganic oxide support by contacting the support with a water-soluble or water-dispersible salt of the platinum group metal for sufficient time to impregnate the inorganic oxide support, followed by a drying step. The impregnation can be accomplished using incipient wetness impregnation wherein minimal volumes of platinum salt solutions are employed to soak the inorganic oxide support. In other embodiments, the impregnation can be achieved by use of larger proportions of platinum group metal salt solutions. Useful platinum group metal salts include, but are not limited to, platinum nitrate, amine-solubilized platinum hydroxide, palladium nitrate, palladium acetate and ruthenium nitrate. The support material containing the platinum group metal component can be calcined to form the platinum group metal or oxide, preferably at a temperature above about 400° C.

It has been found that the activity and the stability, in particular the resistance against aging of the catalyst, can be improved by modifying the inorganic oxide support by the addition thereto of rare earth metal oxide. The rare earth metals are represented by Atomic numbers 57-71 of the Periodic Table of Elements. Preferably, the rare earths which are incorporated into the inorganic oxide support include the oxides of lanthanum, cerium, praseodymium, neodimium, promethium, samarium, europium, and gadolinium. The rare earth metal oxide is preferably dispersed on the inorganic oxide support by contacting the inorganic oxide support with a water-soluble or water-dispersable salt of the rare earth metal for sufficient time to impregnate the inorganic oxide support, followed by a drying step. The impregnation can be accomplished using incipient wetness impregnation wherein minimal volumes of the rare earth salt solutions are employed to soak the inorganic oxide support. In other embodiments, the impregnation can be achieved by use of larger proportions of rare earth metal salt solutions. Preferably, however, an aqueous solution of a water soluble salt of a rare earth element is mixed with the support or hydrated precursor thereof to form a paste or slurry. The paste or slurry is dried and subsequently calcined by any known means. Useful rare earth metal salts include, but are not limited to, the rare earth chlorides, sulfates, nitrates, acetates, etc. Subsequent to drying, the rare earth salt is converted to the oxide by calcination in air at temperatures of above about 300° C. The rare earth oxide will typically comprise 2 to 20 wt. % relative to the catalyst. Levels of the rare earth oxide of 3 to 15 wt. % are also exemplified.

Surprisingly, it has further been found that the stability of the platinum group metal catalysts can be enhanced by mixing the inorganic oxide support with from about 1 to 20 wt. % of a burn-out additive relative to the amount of the support, and heating at a temperature to consume the additive. In general, the burn-out additive is a carbon-based material. Examples of burn-out additives include sugars, starches, and lignin or grain flours such as wood, wheat, corn, rye, etc. Water soluble polymers such as polyethylene oxide, polyvinyl alcohol, etc., can also be used. It is not generally understood how the addition and subsequent removal of the carbon-based burn-out additive from the inorganic oxide support improves catalyst stability. While it was initially thought that consumption of the burn-out additive increased the porosity in the support, such increased porosity has not been found. It is contemplated that the chemical composition of the burn-out ash which remains dispersed in the support in minute amounts may provide the beneficial effect. Thus, the free carbon content or trace amounts of alkali or alkaline earth metals may provide enhanced activity. Regardless, as will be shown later, the addition of the burn-out additive to the inorganic oxide carrier, and subsequent removal of the additive by heat, greatly improves the resistance to aging of the catalyst such that catalytic activity is maintained.

Amounts of the carbon-containing burn-out additive mixed with the inorganic oxide support will generally range from about 2 to 15 wt. % relative to the support. Amounts of from about 2 to less than 10 wt. % of additive are also exemplified. While wood flour has been known for use in catalyst manufacture as a burn-out additive to modify the porous structure of the catalyst, differences in porosity between the unmodified oxide support and modified support as herein disclosed are not seen. After calcination, trace amounts of the additive appear to remain dispersed in the support. It is theorized that the physical and/or chemical nature of the trace content of the additive ash provide the desired catalytic activity enhancement. Specifically, addition of the burn-out additive to the catalyst inorganic oxide support and subsequent removal thereof with heat at, e.g., 500° C. or higher, has been found to improve the stability of the catalyst. In particular, the aging rate of the catalyst is substantially reduced by the addition of the burn-out additive into the inorganic oxide support and subsequent calcination.

The burn-out additive is typically incorporated into the inorganic oxide support by mixing the inorganic oxide with the additive, either in the dry or liquid state, adding sufficient water to form an homogeneous paste or slurry, and then drying the paste at a temperature of about 20-150° C., followed by calcination in air for 0.1-6 hours at about 500-1,000° C. For example, when alumina is used as a support, an additive such as wood flour can be dry-mixed with alumina oxide monohydrate and with sufficient water to form a paste. Preferably, it has been found that by mixing the inorganic oxide support material, the burn-out additive, and the rare earth metal salt with sufficient water to form a paste, drying and then calcining at the above described temperature yields a rare earth oxide modified inorganic oxide support which contains trace amounts of the burn-out additive as ash dispersed therein. Subsequent to forming the support, the platinum metal can be deposited onto the support as described above. For the dry mixing, the inorganic oxide support will generally have a size of from about 1 to about 100 microns, and the burn-out additive will have a size of from about 0.5 to about 50 microns. The burn-out additive can also be mixed with the support in the liquid state such as a water soluble solution, for example.

It has also been found that the initial activity of the catalyst of this invention comprising an inorganic oxide support, a platinum group metal, and a rare earth component, can be enhanced by the addition of alkali metal compounds. In particular, it has been found that the addition of compounds of lithium, sodium, potassium, rubidium, and cerium increases initial catalytic activity. In general, the alkali metal component can be added to the catalyst by dispersing the alkali metal compound in water and impregnating the modified inorganic oxide support, drying and calcining in air to yield the alkali metal oxide. The alkali metal compound can be added simultaneously with the platinum impregnation or in a separate step. For incorporation into the catalyst by impregnation, the alkali metal component can be in the form, for example, of the hydroxide, or chloride, nitrate, sulfate, carbonate salts, etc., or the alkali metal salt of lower organic acids such as the alkali metal acetate salt. In general, the amount of the alkali metal component incorporated into the catalyst as alkali metal will range from about 0.1 to 15 wt. % relative to the rare earth oxide-modified support, with amounts of 0.5 to 10 wt. % also exemplified. The initial enhancement in catalytic activity by the addition of the alkali metal component is seen with or without the addition and subsequent vaporization of the burn-out additive. It is also contemplated with this invention that the support would be modified by the burn-out additive prior to addition of the alkali metal component. Calcination of the support subsequent to the addition of the alkali metal salts will essentially remove the burn-out additive, as previously discussed.

Washcoat compositions, extrudates and tablets of the catalyst are preferably formed from powdered catalyst compositions containing the platinum group metal, rare earth metal oxide, alkali metal oxide, and burn-out additive which has been calcined and substantially removed from the support. Alternatively, the platinum group metal may be added after forming the catalyst composition into any of the useful forms.

In embodiments of the invention wherein the catalyst is in the form of extrudates, the calcined, powdered catalyst containing inorganic oxide support modified with rare earth metal oxide and trace amounts of burn-out additive, and platinum group metal are typically mixed with a binder and extruded through a die of the desired shape, dried and calcined. Alternatively, powdered catalyst containing inorganic oxide support, modified with burn-out additive, and the rare earth metal oxide, and, optionally, binder can be extruded, dried and calcined. The calcined extrudate can then be impregnated with the platinum group metal and alkali metal component. Typical useful binders include hydrated forms of alumina (e.g., pseudoboehmite), silica binders, clay binders, zirconia binders and the like. Subsequent calcination yields the desired catalytically active metallic particles on the support and converts the burn-out additive to ash present in trace amounts.

Tablets can be prepared by: (1) combining the calcined, powdered oxide support modified with rare earth oxide and containing burn-out additive with a binder; (2) shaping the combined powder and binder into the desired shape which could include tablets, pellets, beads, cylinders or hollow cylinders; and (3) calcining the shaped catalyst. The support can be impregnated with the platinum group metal before or after the tablet shaping steps.

Washcoat compositions (or "slurries") of the catalyst for deposition on substrates are prepared using methods known in the art. Preferably, the catalyst is ball milled as a suspension using sufficient water to prepare a slurry of a desired concentration. The concentration of the solids in the washcoat slurry can be used as a method to control the thickness of the catalyst coating ultimately deposited on the substrate. For example, increasing the weight percentage of solids in the aqueous slurry will result in a thicker catalytic coat.

It is also generally advantageous to prepare slurries having particles of small particle sizes, e.g., less than 10 μm, to anchor the catalyst on the substrate. Therefore, the particle size distribution of the slurry is typically measured, and milling is continued until the desired particle size has been achieved. Here again, binders such as hydrated forms of alumina, e.g., pseudoboehmite, are optionally included in the slurries to improve adherence of the washcoat to the substrate walls.

The washcoat slurries are deposited on the substrates by methods well-known to those of ordinary skill. Thus, for example, in a typical honeycomb substrate preparation, a layer of the supported platinum group metal-based catalyst can be prepared by dipping the substrate in a reservoir containing a sufficient volume of the slurry so that the substrate is fully immersed. The coated substrate can be subsequently dried and calcined.

As mentioned above, the washcoat catalyst compositions of the invention are disposed on substrates to form coated monolith substrates. Although a variety of substrates can be used, the substrate is preferably of the type with one or more monolithic bodies having a plurality of finely divided gas flow passages (channels) extending there through. Preferably, the monolith substrate is of the type having a plurality of fine, parallel gas flow passages extending across the longitudinal axis of the substrate from an inlet or an outlet face, so that the channels are open to fluid flow there through (often referred to as a "honeycomb substrate"). The passages, which are essentially straight from the inlet and outlet of the substrates, are defined by walls on which the catalyst composition can be coated in washcoat compositions so that the gases flowing through the passages contact the catalyst material.

Monolithic, honeycomb substrates are commercially available in various sizes and configurations. The flow passages of the monolithic substrate are thin-walled channels which can be of any suitable cross-sectional shape and size such as trapezoidal, rectangular, square, sinusoidal, hexagonal, oval, circular. Such monolithic substrates may contain up to about 700 or more flow channels ("cells") per square inch of cross section, although far fewer may be used. For example, the substrate can have from about 60 to 600, more usually from about 200 to 400 cells per square inch ("cpsi").

Various types of materials of construction for honeycomb substrates are known. The honeycomb substrate can be made from a variety of materials, including metal or ceramic materials. In some embodiments, the monolith substrate can be made from a ceramic porous material composed of one or more metal oxides, e.g., alumina, alumina-silica, alumina-silica-titania, mullite, cordierite, zirconia, zirconia-ceria, zirconia-spinel, zirconia-mullite, silicon-carbide, and the like. Some non-limiting examples of ceramic monoliths can include those made of: zirconium, barium titanate, porcelain, thorium oxide, magnesium oxide, steatite, boron or silicon carbonates, cordierite-alpha alumina, silicon nitride, spodumene, alumina-silica magnesia, zircon silicate, sillimanite, magnesium silicates, zircon, petalite, alpha alumina and aluminosilicates. One example of a commercially available material for use as the substrate for the present invention is cordierite, which is an alumina-magnesia-silica material.

The metallic monolith substrate can be a honeycomb substrate made of a refractory metal such as a stainless steel or other suitable iron based corrosion resistant alloys (e.g., iron-chromium alloy). Metal monoliths can be produced, for example, from alloys of chromium, aluminum and cobalt, such as those marketed under the trademark KANTHAL, or those produced from alloys of iron, chromium, aluminum and yttrium, marketed under the trademark of FECRALLOY. The metal can also be carbon steel or simple cast iron. Monolith substrates are typically fabricated from such materials by placing a flat and a corrugated metal sheet one over the other and rolling the stacked sheets into a tubular configuration about an axis parallel to the configurations, to provide a cylindrical-shaped body having a plurality of fine, parallel gas flow passages, which can range, typically, from about 200 to about 1,200 per square inch of face area. Heat exchangers, which are typically formed from metallic materials, can also be used as the monolith structures.

In other embodiments, the substrate can be made of a ceramic or metal foam. Substrates in the form of foams are well known in the prior art, e.g., see U.S. Pat. No. 3,111,396, hereby incorporated by reference.

The invention also relates to processes for using the catalysts of the invention. In a preferred embodiment the catalysts of the invention can be used in processes for producing hydrogen via the water-gas shift reaction. For example, the catalyst of the invention can be incorporated in a reactor that is charged with an input gas stream containing carbon monoxide and steam to produce hydrogen and carbon dioxide as products in the output gas stream.

The composition of the input gas stream for the process can vary depending on the source of the reactant carbon monoxide. The process of the invention is particularly effective wherein the carbon monoxide concentration is present in levels up to 20% by volume. Typically, molar excesses of steam are used relative to the amount of carbon monoxide introduced into the input gas stream. Generally, $H_2O:CO$ molar ratios of between 1:1 (i.e., "1.0") and 20:1 (i.e., "20.0") are preferred in the input gas stream, with higher ratios being particularly preferred for high conversion of carbon monoxide.

In fuel cell applications of the inventive process, input gas streams typically contain at least 10% by volume of hydrogen in addition to the carbon monoxide and steam. Higher volumes of hydrogen, e.g., greater than 30-40% by volume, are often utilized in fuel cell applications. The input gas stream typically contains 10-25% by volume of carbon dioxide.

In addition to carbon monoxide, carbon dioxide, steam and hydrogen, the input gas stream can contain nitrogen, and minor amounts of olefins, alcohols, aldehydes and/or other hydrocarbons. Preferably, the input gas stream contains not more than 4-5% by volume of hydrocarbons.

A useful operating temperature of the water-gas shift process is about 150 to 450° C. A preferred operating range is from 250 to 400° C. The optimal temperature ranges for these catalysts make it an ideal candidate for incorporation into fuel processors reactors that serve as the "high-temperature" component in water-gas shift reactors. The platinum metal group-based catalyst may be used, for example, in place of high temperature iron-chromium based water-gas shift catalysts such as $Fe_2O_3/Cr_2O_3$ that typically operate at about 350° C.

Reaction zone pressure is preferably maintained below the dew point pressure of the reaction mixture. It should be recognized that lower or higher reaction zone pressures can be used, such as from atmospheric up to about 500 psig.

Preferably, the water-gas shift reaction process is carried out in a continuous mode with the reactants being passed over the catalyst contained in one or more reaction zones. Gaseous hourly space velocities of about 500 to about 50,000 $hr^{-1}$ VHSV measured on the basis of dry gas under standard conditions are particularly suitable for most fuel cell operations. In embodiments wherein the catalysts are in the form of washcoat compositions deposited on monolith substrates, space velocities of over 100,000 $hr^{-1}$ VHSV are possible. A preferred operating range for the catalysts of the invention in the form of washcoat compositions deposited on monolith substrates is from 1,000-50,000 VHSV. Those skilled in the art will recognize that lower gas reactant flow rates favor more complete CO conversion.

Although the water-gas shift catalysts and processes of the invention can be used in any application where hydrogen production is needed, a particularly useful application is in apparatus such as fuel processors that supply hydrogen to fuel cells. As discussed above, these systems typically comprise a series of reactors that convert hydrocarbon fuels (e.g., natural gas, gasoline, fuel oil, liquid petroleum gas, and the like) into hydrogen fuel. The conversions that take place in the reactors include reforming reactions and water gas shift reactions to produce hydrogen. Other reactors and trapping devices can also be included in the apparatus that reduce unwanted components in the hydrogen feed streams (e.g., carbon monoxide and sulfur components), which are ultimately supplied to the fuel cell.

EXAMPLES

Example 1

Neodimium-modified alumina support material was prepared by impregnating $Al_2O_3$ powder with an appropriate amount of aqueous solution of neodymium nitrate hexahydrate, which was followed by drying for 4 hours at 120° C. in air and calcining for 2 hours at 450° C. in air. The obtained neodimium-modified alumina support material contained 5 wt. % $Nd_2O_3$ relative to $Al_2O_3$. The support material was further impregnated with platinum amine salt, dried at 120° C. and calcined at 500° C. so that the resulting catalyst contained 3 wt. % Pt relative to the weight of the support material.

0.75 gram of the catalyst was loaded into a laboratory flow reactor and heated up to 350° C. in the flowing feed gas (a mixture of 9.8% CO, 7.7% $CO_2$, 52.5% $H_2$, and 30% $H_2O$). The catalyst initiated the water-gas shift reaction $CO+H_2O \rightarrow CO_2+H_2$. Progress of the reaction was controlled by monitoring the CO outlet concentration with an online infrared gas analyzer ZRH (Fuji Electric, Japan). The catalyst was continuously tested for a period of 20 hours. The catalytic performance was characterized by (i) the initial activity and (ii) the aging rate. The initial activity was expressed as the CO conversion achieved at the initial period of the test; the aging rate was expressed as the change in the CO outlet concentration divided by the duration of the test.

Figure 2:
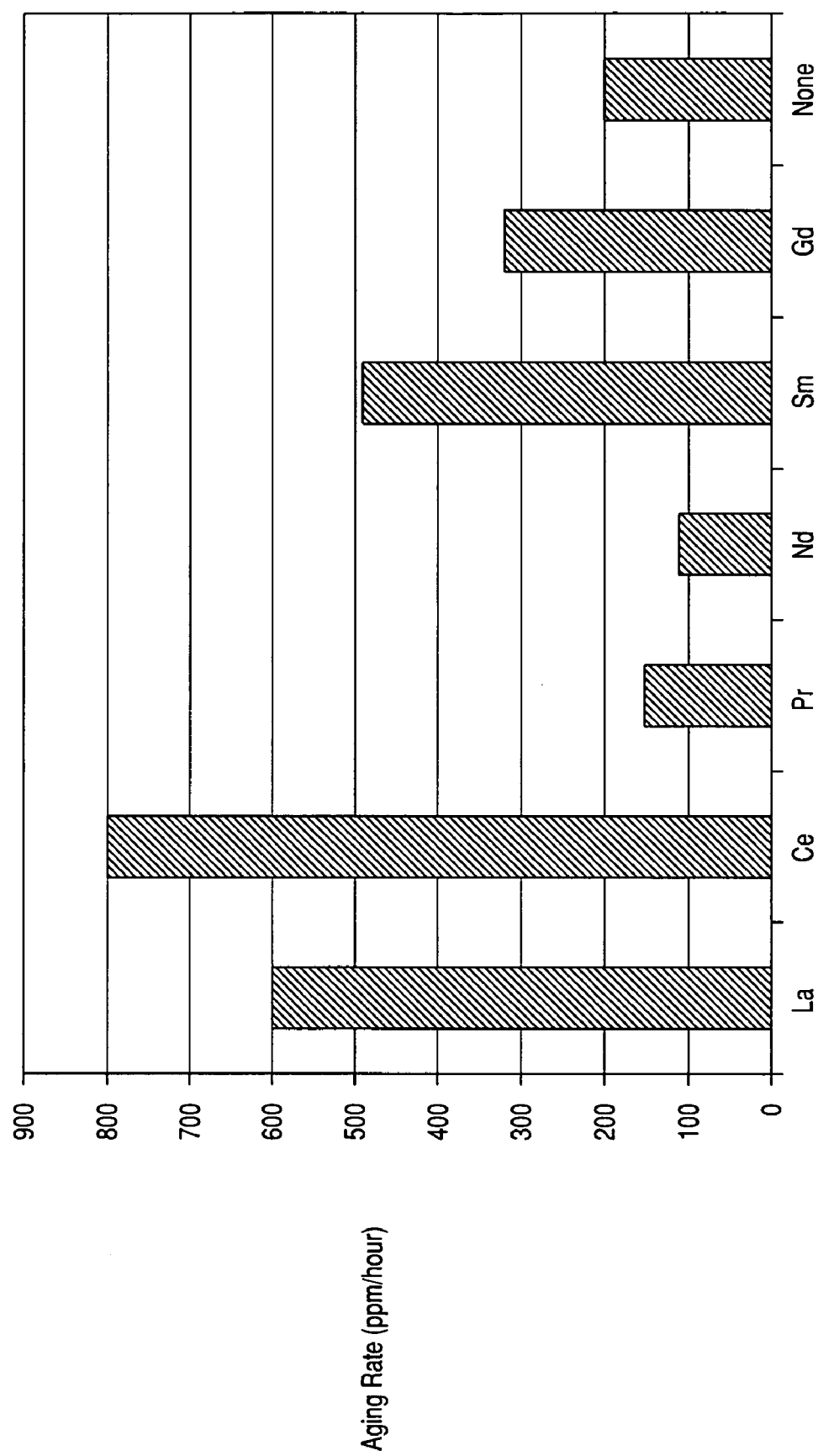
FIG. 2 is a bar graph comparing the stabilities of Pt catalysts over different rare earth oxide-modified alumina supports during a water gas shift reaction.

Catalytic test results are shown in FIG. 1 and FIG. 2, which show the initial activities and the aging rates, respectively, for the samples described in Examples 1-7. Unless otherwise indicated, GHSV was equal to 144,000 $h^{-1}$.

Example 2

A catalyst was prepared as described in Example 1, except that lanthanum nitrate hexahydrate was used in place of neodimium nitrate hexahydrate. The catalyst was tested as described in Example 1, and the test results are shown in FIGS. 1-2.

Example 3

A catalyst was prepared as described in Example 1, except that praseodimium nitrate hexahydrate was used in place of neodimium nitrate hexahydrate. The catalyst was tested as described in Example 1, and the test results are shown in FIGS. 1-2.

Example 4

A catalyst was prepared as described in Example 1, except that gadolinium nitrate hexahydrate was used in place of neodimium nitrate hexahydrate. The catalyst was tested as described in Example 1, and the test results are shown in FIGS. 1-2.

Example 5

A catalyst was prepared as described in Example 1, except that cerium nitrate hexahydrate was used in place of neodimium nitrate hexahydrate. The catalyst was tested as described in Example 1, and the test results are shown in FIGS. 1-2.

Example 6

A catalyst was prepared as described in Example 1, except that samarium nitrate hexahydrate was used in place of neodimium nitrate hexahydrate. The catalyst was tested as described in Example 1, and the test results are shown in FIGS. 1-2.

Example 7

A catalyst was prepared as described in Example 1, except that no rare earth dopant was added to the $Al_2O_3$ support. The catalyst was tested as described in Example 1, and the test results are shown in FIGS. 1-2.

As can be seen from FIG. 1, modifying the alumina support with rare earth oxides greatly increases the initial activity relative to the unmodified sample. Aging rates for the catalysts described in Examples 1-7 vary (FIG. 2). Only the addition with Pr and especially with Nd resulted in significantly lower aging rates relative to the unmodified sample.

Example 8

Figure 3:
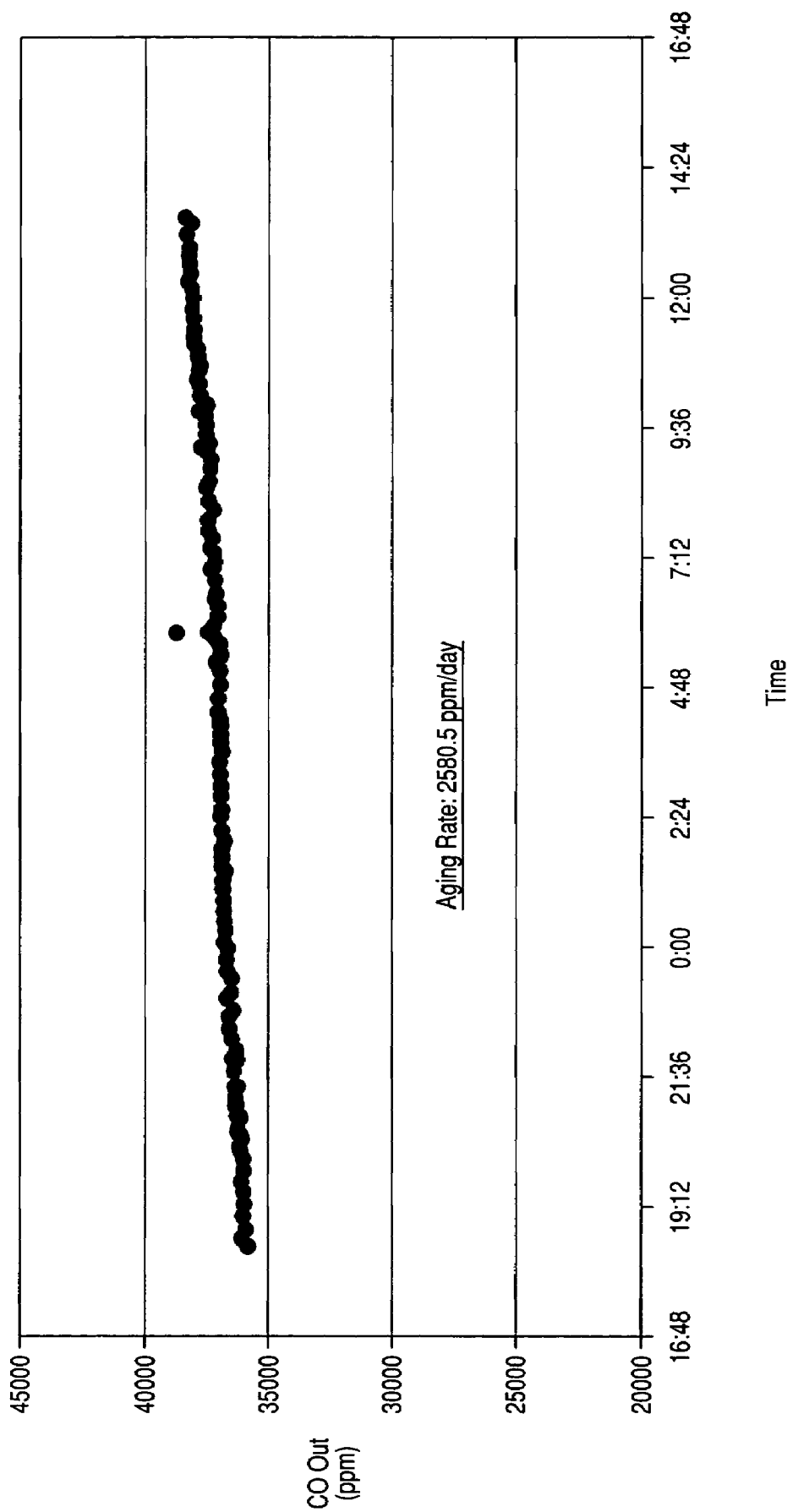
FIG. 3 is a graph of the aging rate of a $Pt/Al_2O_3$ catalyst modified with $Nd_2O_3$ and wood flour during a water gas shift reaction.

A neodimium-modified alumina support was prepared as follows: (1) 100 g of aluminum oxide monoxydrate was dry mixed with 6 g of wood flour; (2) 23.74 g $Nd(NO_3)_3$ dissolved in 120 cc of 1.2% $HNO_3$ aqueous solution was added to the $Al_2O_3$/wood flour mix, and mixed into a homogeneous paste; (3) the paste was dried 2 hours at 120° C.; (4) the dried paste calcined for 2 hours at 800° C. The produced alumina-neodimium oxide support material contained 12 wt. % $Nd_2O_3$ relative to $Al_2O_3$. Platinum deposition, 4 wt. %, onto the support was accomplished as in Example 1. The catalyst testing was also performed as described in Example 1. The WHSV was 107,000. The aging rate of the catalyst was determined to be 2580.5 ppm/day as illustrated in FIG. 3.

Example 9

Figure 4:
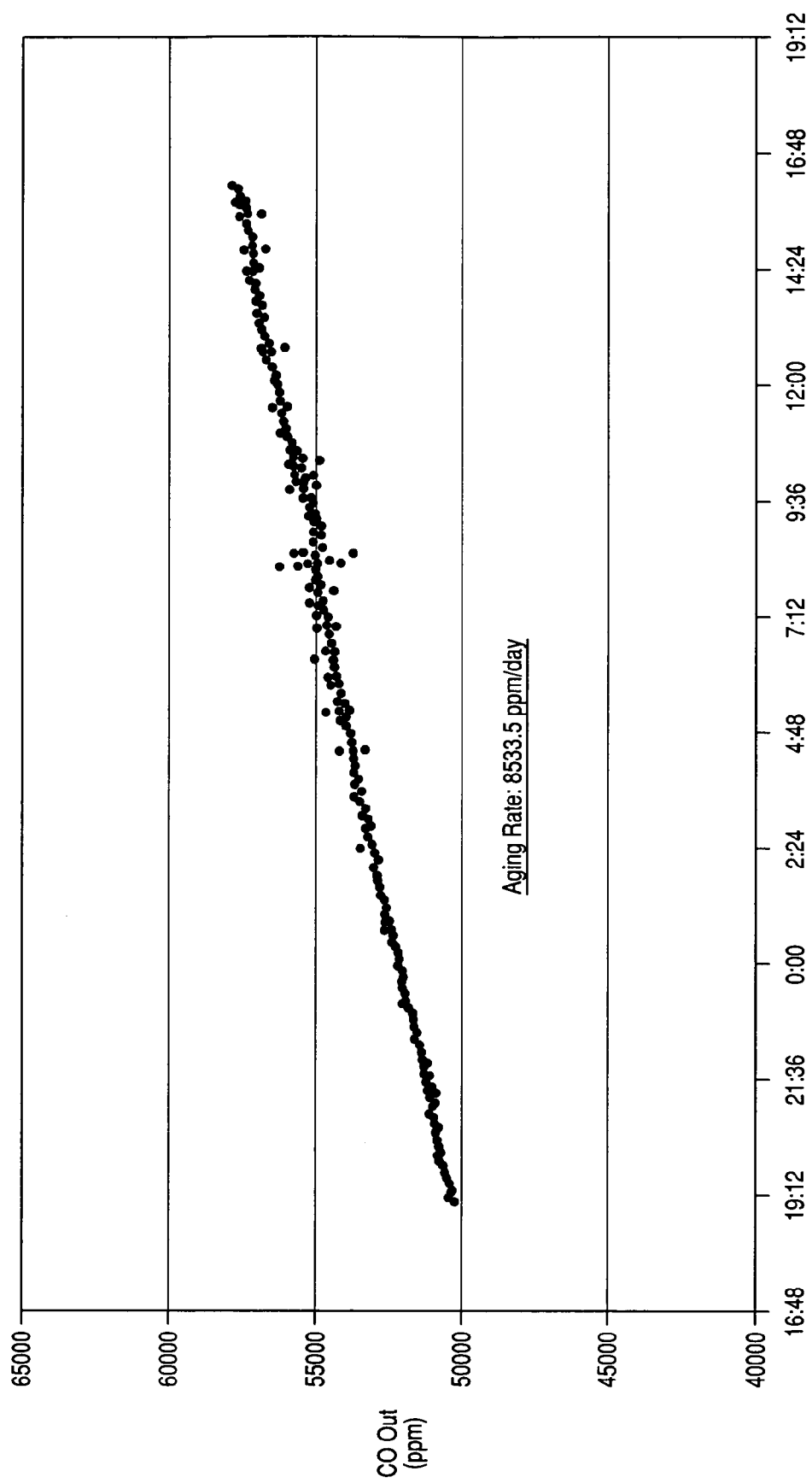
FIG. 4 is a graph of the aging rate of a $Pt/Al_2O_3$ catalyst modified with $Nd_2O_3$ and without wood flour during a water gas shift reaction.

A neodimium-modified alumina support was prepared as described in Example 8, except that no wood flour was used. Platinum deposition at 4 wt. % onto the support and the catalyst testing were performed as described in Example 8. The aging rate of the catalyst was determined to be 8533.5 ppm/day as illustrated in FIG. 4.

The addition of the wood flour to the support yielded a more stable catalyst that was able to best reduce the drop in initial activity.

Example 10

A catalyst prepared as described in Example 8 was further impregnated with sodium carbonate solution. The amount of sodium carbonate taken for the impregnation corresponded to 2 wt. % Na (as element) relative to the weight of the catalyst without Na. The impregnated catalyst was dried at 120° C. for 2 hours and calcined in air at 450° C. for 2 hours.

Figure 5:
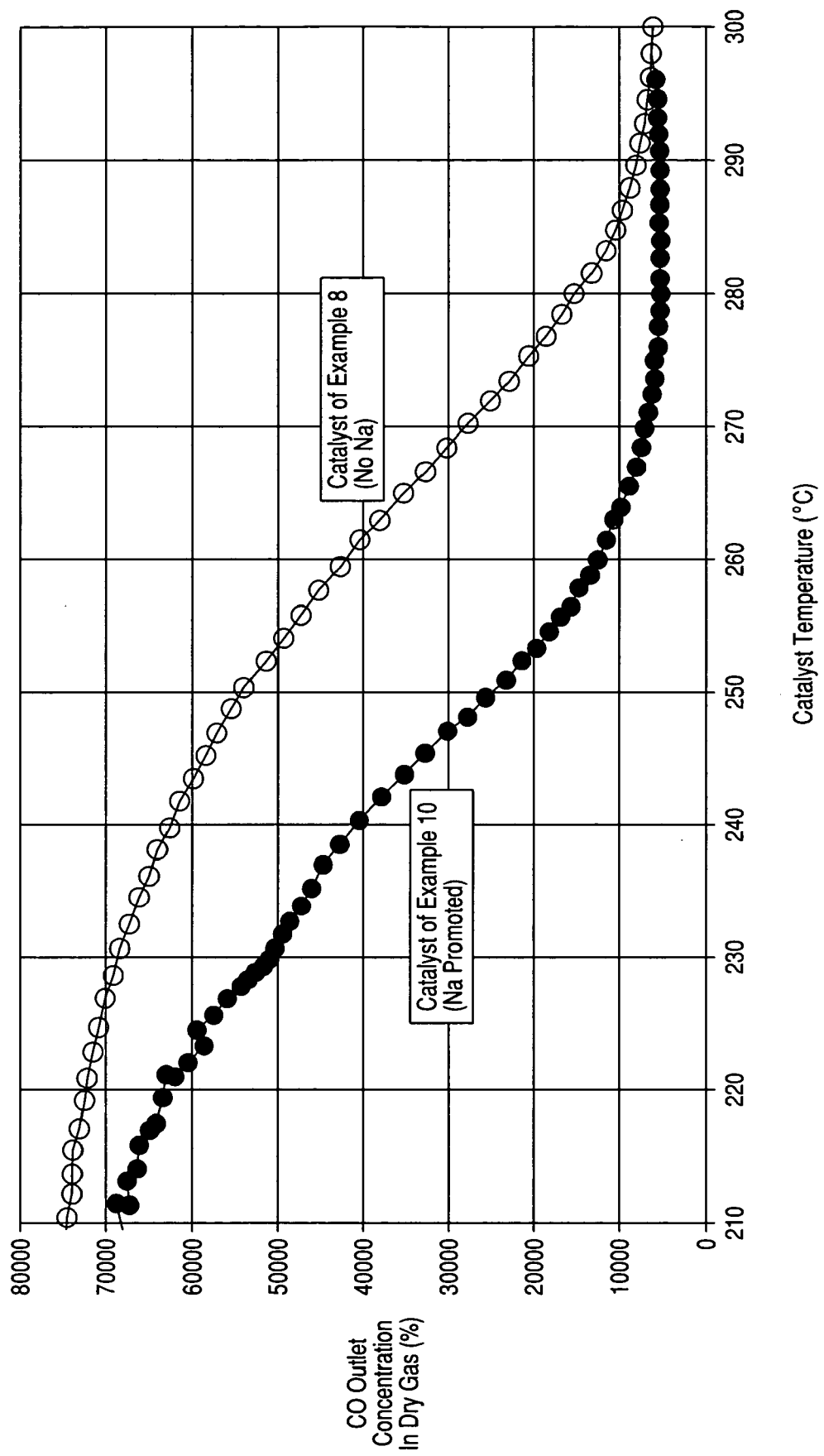
FIG. 5 is a graph comparing the activities of Na-promoted and non-promoted $Pt/Al_2O_3$ catalysts modified with $Nd_2O_3$ and wood flour during a water gas shift reaction.

The activities of the catalysts of Example 10 and Example 8 were compared by running the water-gas shift reaction under identical conditions. The feed was a mixture of 5.6% CO, 7.0% $CO_2$, 30.1% $H_2$, 27.3% $N_2$, and 30% $H_2O$. In the runs, the catalyst temperature was programmed to increase from 200° C. to 300° C. at 3° C./min. GHSV was equal to 23,000 $h^{-1}$. The test results are shown in FIG. 5. As can be seen, in the whole temperature interval the Na-promoted catalyst yielded significantly lower CO concentrations at the reactor outlet (i.e., higher activity) compared to the non-promoted analog.

Once given the above disclosure, many other features, modifications, and improvements will become apparent to the skilled artisan. Such other features, modifications, and improvements are, therefore, considered to be a part of this invention, the scope of which is to be determined by the following claims.

What is claimed is:

1. A method of producing hydrogen from an input gas stream comprising carbon monoxide and steam, comprising: contacting the input gas stream with a catalyst comprising: an inorganic oxide support modified by addition of a carbon-containing bum-out additive and subsequent removal of said additive by heat, said catalyst containing a platinum group metal dispersed on said modified inorganic oxide support.

2. The method of claim 1 wherein said platinum group metal comprises from about 0.1 to 10 wt. % relative to said inorganic oxide support.

3. The method of claim 1 wherein said modified inorganic oxide support is further modified by addition of a rare earth oxide.

4. The method of claim 3 wherein said rare earth oxide comprises from about 2 to 20 wt. % relative to said further modified inorganic oxide support.

5. The method of claim 1 wherein the catalyst is in the form of a washcoat composition deposited on a honeycomb monolith.

6. The method of claim 1 wherein said gas stream is contacted with said catalyst at a temperature above 150° C.

7. The method of claim 1 wherein said bum-out additive is present in amounts of from about 1 to 20 wt. % based on said modified inorganic oxide support prior to removal of said additive by heat.

8. The method of claim 1 wherein said bum-out additive is selected from the group consisting of sugars, starches, lignin, grain flour, wood flour, and polymers.

9. The method of claim 4 wherein said catalyst further includes an alkali metal component.

10. A method of producing hydrogen from an input gas stream comprising carbon monoxide and steam, comprising: contacting the input gas stream with a catalyst comprising: an alumina support modified by the addition of 2 to 20 wt. % relative to the modified alumina support of a rare earth oxide selected from praseodymium and neodimium oxide, and a platinum group metal dispersed on said alumina support.

11. The method of claim 10 wherein said platinum group metal is selected from the group consisting of platinum, palladium, rhodium, ruthenium, and iridium.

12. The method of claim 10 wherein said catalyst further includes an alkali metal component.

* * * * *